(12) United States Patent
Byman Johnson

(10) Patent No.: US 11,913,320 B1
(45) Date of Patent: Feb. 27, 2024

(54) MOBILE FRACTURING SAND PLANT AND SYSTEMS AND METHODS OF OPERATING SAME

(71) Applicant: Nomad Proppant Services, LLC, Austin, TX (US)

(72) Inventor: Bradley Byman Johnson, North Mankato, MN (US)

(73) Assignee: Nomad Proppa nt Services, LLC, Houston, TX (US)

( * ) Notice: Subject to any disclaimer, the term of this patent is extended or adjusted under 35 U.S.C. 154(b) by 171 days.

(21) Appl. No.: 17/444,800

(22) Filed: Aug. 10, 2021

Related U.S. Application Data

(60) Provisional application No. 63/071,615, filed on Aug. 28, 2020.

(51) Int. Cl.
| | |
|---|---|
| *C02F 11/12* | (2019.01) |
| *E21B 43/34* | (2006.01) |
| *C02F 11/127* | (2019.01) |
| *C02F 11/123* | (2019.01) |
| *C02F 103/10* | (2006.01) |

(52) U.S. Cl.
CPC ............ *E21B 43/35* (2020.05); *C02F 11/123* (2013.01); *C02F 11/127* (2013.01); *C02F 2103/10* (2013.01); *C02F 2201/008* (2013.01)

(58) Field of Classification Search
CPC ...... E21B 43/35; C02F 11/123; C02F 11/127; C02F 2103/10; C02F 2201/008
See application file for complete search history.

(56) References Cited

U.S. PATENT DOCUMENTS 9,737,919 B2 * 8/2017 Hartley .................. B65G 33/14

* cited by examiner

*Primary Examiner* — Waqaas Ali
(74) *Attorney, Agent, or Firm* — AVEK IP, LLC

(57) ABSTRACT

A mobile dewatering system includes a dewatering bin pivotally coupled to a trailer chassis and selectively operable to pivot between a transport configuration and an operation configuration. The dewatering bin has a cylindrical section and a dewatering cone. The dewatering cone includes an outer wall and a screen spatially adjacent the outer wall forming a void therebetween. A plurality of perforated pipes is positioned vertically around an inner circumference of the cylindrical section and intersect the screen such that water from the particle slurry passes into the perforated pipes and drops into the void. A particle slurry introduced into the dewatering cone contacts the screen, and water from the particle slurry passes through the screen and into the void. Water in the void is discharged away from the mobile dewatering system, and dewatered particles pass from the dewatering cone through a discharge port in the bottom of the dewatering cone.

22 Claims, 14 Drawing Sheets

MOBILE FRACTURING SAND PLANT AND SYSTEMS AND METHODS OF OPERATING SAME

CROSS-REFERENCE TO RELATED APPLICATIONS

This application claims the benefit of priority of U.S. Provisional Patent Application No. 63/071,615, filed Aug. 28, 2020, the disclosure of which is incorporated by reference herein in its entirety.

BACKGROUND

Hydraulic fracturing is ubiquitous in the oil and gas industry. Typically, hydraulic fracturing operations utilize a fracking fluid that includes a mixture of sand, water, and chemicals which is pumped into the wellbore. The fracking fluid creates small cracks in the subterrain, and the sand acts to prop the cracks open, allowing oil to flow from the cracks. Historically, most fracturing sand used in fracking fluids was coarse, such as 20/40 grade. Because it can be difficult to source quality coarse deposits, many mining companies found mines far from the wellsite which required the deposits to be shipped long distances.

More recently, the demand for finer fracturing sand, such as 40/70 and 100 M grades, has increased. Ore in the Permian Basin is widely available, and mining companies have therefore built production facilities much closer to the wellsite allowing fracking sand to be shipped to the wellsite via truck. Such facilities can produce 1-10 million tons annually of fracking sand; however, even being closer to the wellsite, the cost and logistics required to get the sand from the mine to the wellsite is less than ideal.

Additionally, because the sand is transported to the wellsite dry, the fracking fluid must be prepared at the wellsite. The sand is stored in storage bins until it is conveyed into a blender module, which also requires the sand to be mostly dry.

A mobile means of producing fracturing sand that allows for pumping of a sand-containing slurry from the mine to the wellsite, and subsequently preparing the fracking fluid for pumping into the wellbore would be useful.

SUMMARY

The following presents a simplified summary of the invention in order to provide a basic understanding of some aspects thereof. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

According to one embodiment, a mobile dewatering system having a first dewatering module that includes a dewatering bin; and a hydrocyclone mounted atop the dewatering bin such that a particle slurry from the hydrocyclone passes directly into the dewatering bin. The dewatering bin is pivotally coupled to a trailer chassis and is selectively operable to pivot between a transport configuration and an operation configuration.

According to another embodiment, a mobile dewatering system includes a dewatering bin pivotally coupled to a trailer chassis and selectively operable to pivot between a transport configuration and an operation configuration. A separation unit is operably coupled to the dewatering bin such that a particle slurry from the separation unit passes to the dewatering bin.

In still another embodiment, a mobile dewatering system includes a dewatering bin pivotally coupled to a trailer chassis and selectively operable to pivot between a transport configuration and an operation configuration. The dewatering bin has a cylindrical section and a dewatering cone. The dewatering cone includes an outer wall and a screen spatially adjacent the outer wall forming a void therebetween. A plurality of perforated pipes is positioned vertically around an inner circumference of the cylindrical section and intersect the screen such that water from the particle slurry passes into the perforated pipes and drops into the void. A particle slurry introduced into the dewatering cone contacts the screen, and water from the particle slurry passes through the screen and into the void. Water in the void is discharged away from the mobile dewatering system, and dewatered particles pass from the dewatering cone through a discharge port in the bottom of the dewatering cone.

BRIEF DESCRIPTION OF THE DRAWINGS

Illustrative embodiments of the disclosure are described in detail below with reference to the attached figures.

WRITTEN DESCRIPTION

Systems and methods for producing and transporting fracturing fluids for use in the hydraulic fracturing of oil well, and components thereof, are described herein.

Typically, sand is classified using product screens. Such screens require the sand to be dried before it can be classified. Most production processes utilize fluid bed dryers, rotary dryers, or a combination of the two, although other methods are also utilized. Unfortunately, such dryers are expensive to install and to operate, and they also require significant infrastructure. In fracking operations, sand for use in fracking fluids is usually classified before reaching the well site. In such cases, sand is transported to a wellsite (in dry form) via truck. Once at the wellsite, the sand is stored in storage bins, and eventually conveyed into a blender to be mixed with fluids and sent to the well. This requires considerable equipment and manpower, and the amount of sand that can be stored is limited by the storage capacity of the containers on site.

If the sand could be pumped to the wellsite, transportation costs and logistical complexities associated with operating a trucking fleet could be significantly reduced, and the amount of sand delivered to the well site would be restricted only based on the needs of the frack job. However, it is not a simple task to pump a sand-and-water slurry between locations. The concentration of solids in the slurry must be low enough that sand will not settle out in the pipe. Currently, there are no methods of delivering a sand-and-water slurry to the wellsite in useable form such that it can be immediately sent to the blender module upon reaching the wellsite.

According to embodiments, a portable fracturing sand plant for receiving and processing wet sand is provided. The plant is configured to process proppants (e.g., fracking sand) for use in fracturing fluids using only a wet process. As is described in greater detail below, the sand plant accepts wet sand and is configured to classify sand to grade and subsequently store and transport the sand to one or more blenders for final constitution of the fracking fluid.

Figure 1:
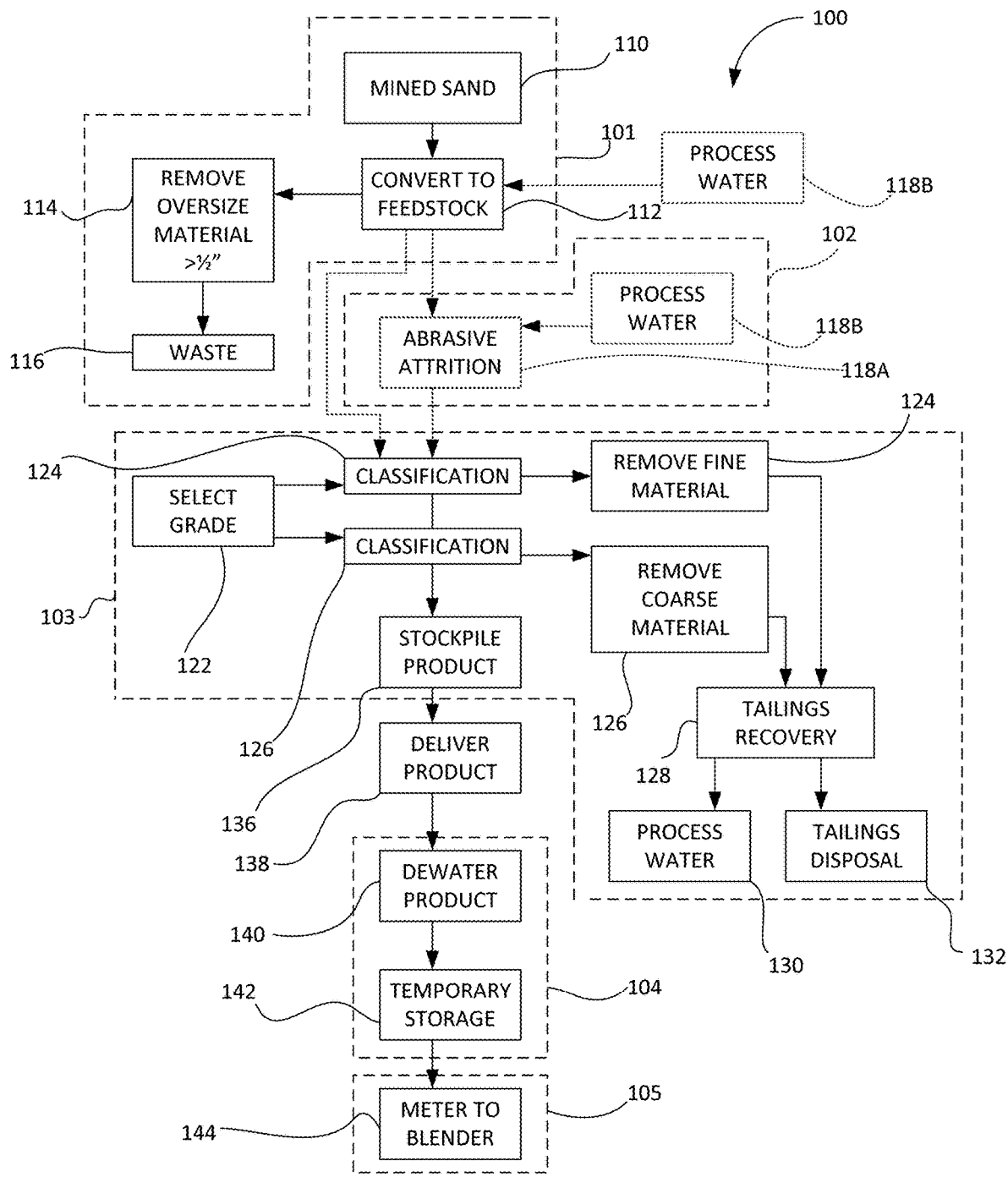
FIG. 1 is a flow diagram of a process for producing fracturing sand according to embodiments of the invention.

FIG. 1 is a block diagram illustrating the general process 100 of providing fracking sand utilizing the mobile fracturing sand plant according to embodiments of the invention. Briefly, the process includes five phases that together provide the means for producing sand for a fracturing fluid. In the first phase 101, the sand is recovered and converted into feedstock. In an optional second phase 102, the feedstock undergoes attrition treatment. In embodiments, the process 100 does not include the second phase 102, and proceeds from phase 101 to phase 103. In the third phase 103, the sand is classified to grade and ultimately delivered to its near-final location (e.g., the wellsite) as a slurry. At the fourth phase 104, the sand-containing slurry is dewatered and temporarily stored until the fifth phase 105, when the sand is metered to the blender where fluids are added to the sand to produce the final fracking fluid which is subsequently delivered into the wellbore as part of the fracking operations.

Figure 11:
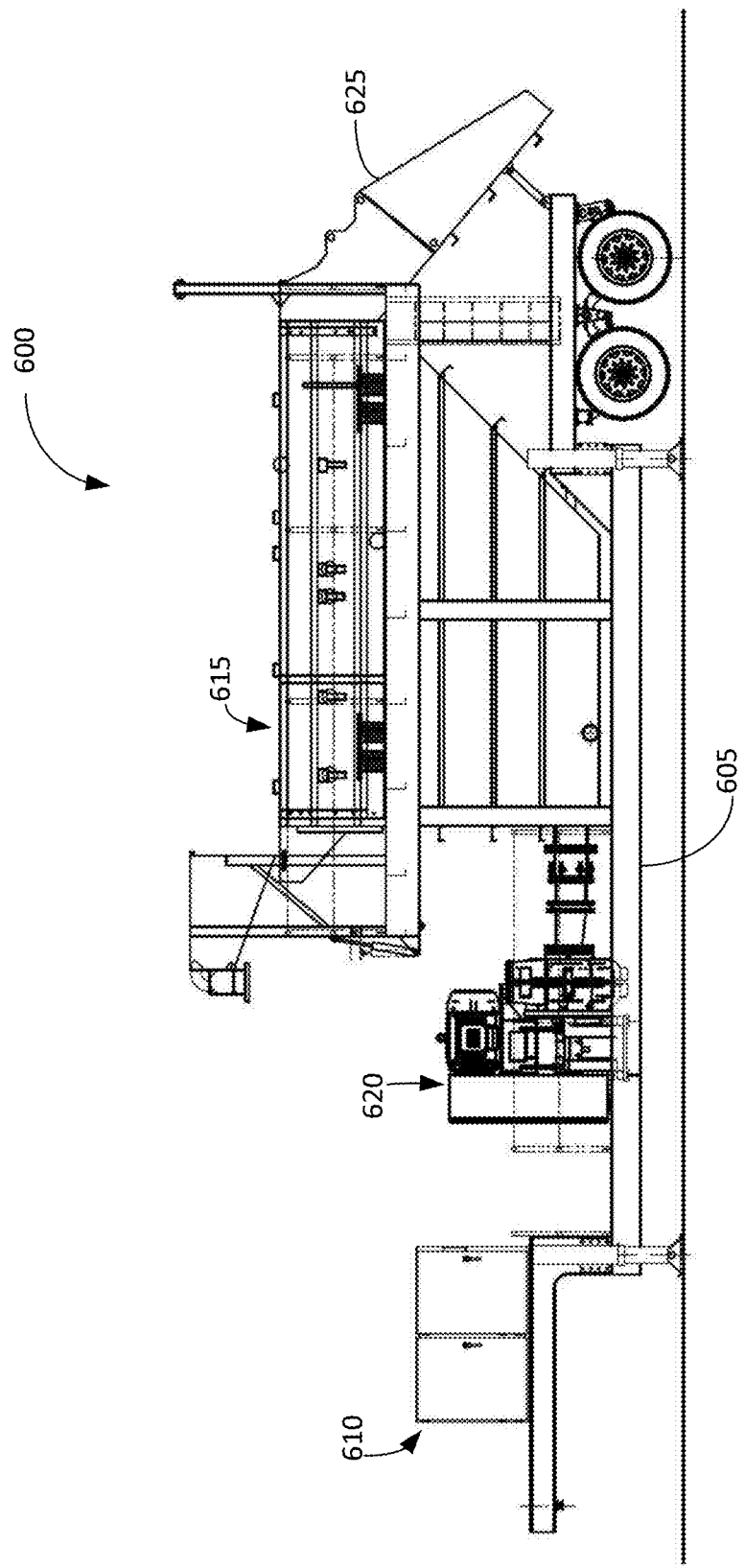
FIG. 11 illustrates a mobile screener used in a process of producing fracturing sand according to embodiments of the invention.
Figure 12:
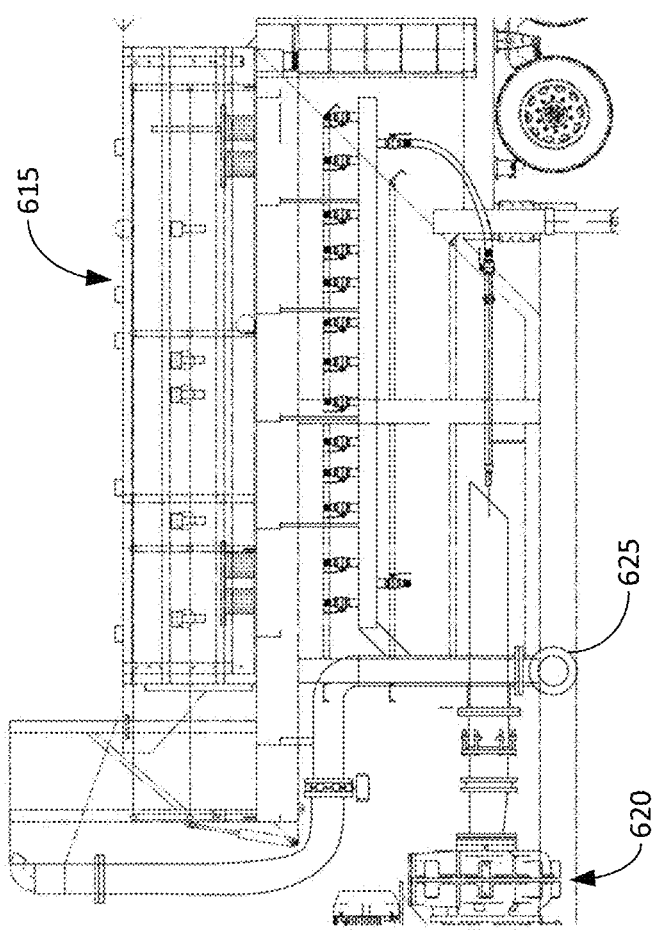
FIG. 12 is a close-up view of a portion of the mobile screener of FIG. 11.

The process 100 begins with the first phase 101 at step 110, where sand is mined from sandstone according to known processes. The sand is converted into feedstock at step 112, and at step 114, the feedstock is screened to remove oversized material (e.g., material that is greater than ½" in diameter, such as large rocks or tree roots). The screening may be accomplished using any screening materials and/or processes now known or subsequently discovered. For example, a mobile screening module 600, illustrated in FIGS. 11, 12A and 12B, may be utilized for screening the feedstock. The mobile screening module 600 is situated on a chassis 605. The chassis 605 may be any trailer designed to support the necessary equipment and includes a plurality of wheels and means for operably coupling to a truck for transport. A power and control panel 610 is provided for powering and controlling the mobile screening module 600. The module 600 includes a screener 615 and a slurry pump 620. The screener 615 receives mined sand and feed water from a water line 625. The screener 615 screens the sand, and oversized material is discharged via a discharge chute 625. The material discharged from the discharge chute 625 is removed as waste at step 116. The remaining feedstock, consisting of a sand and water slurry, is pumped from the screening module 600 via the slurry pump 620 to phase 102, or phase 103 if phase 102 is omitted.

Figure 2:
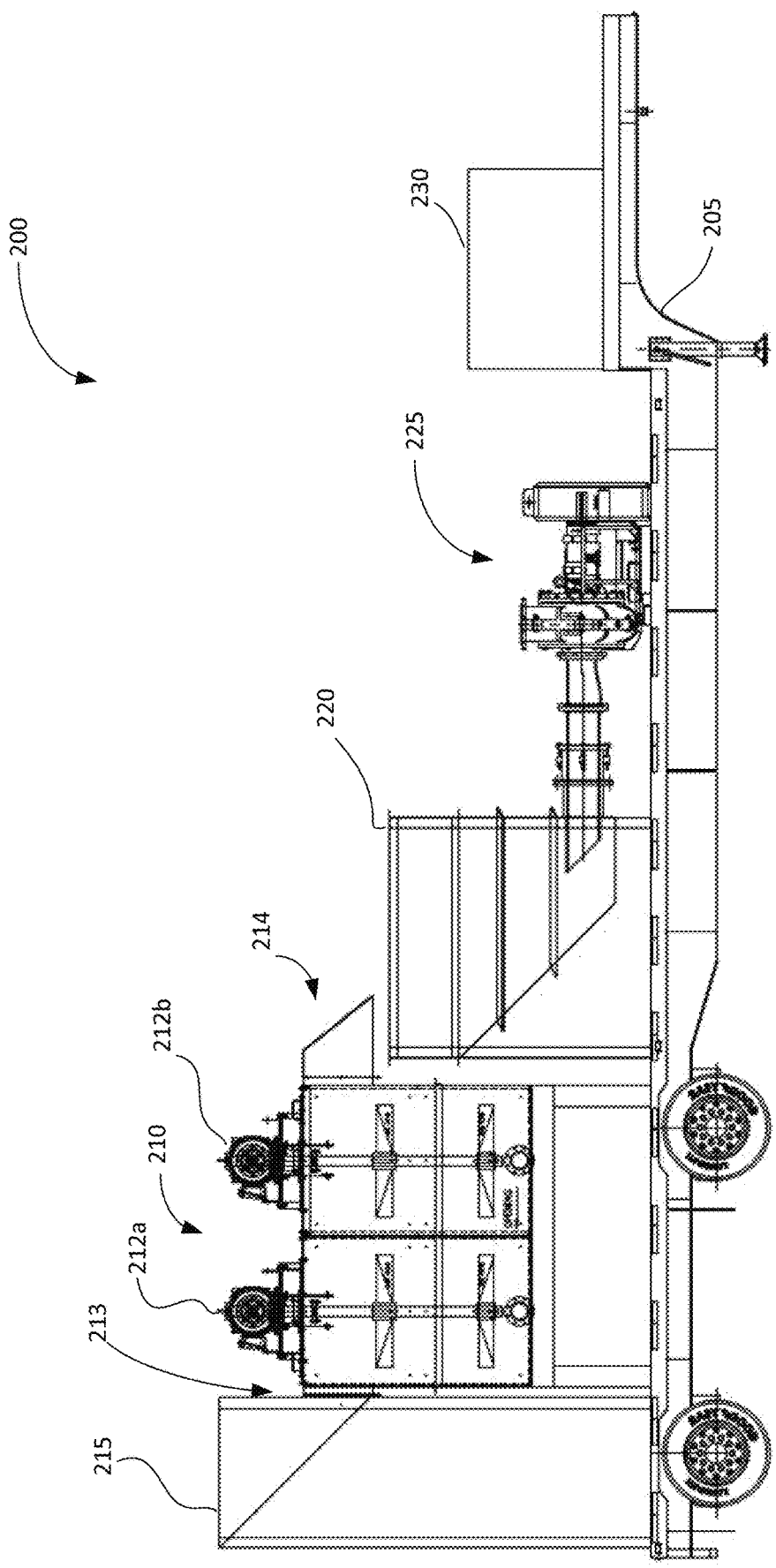
FIG. 2 illustrates an attrition scrubber module used in a process of producing fracturing sand according to embodiments of the invention.

During phase 102, if phase 102 is utilized, the feedstock undergoes an abrasive attrition process. The attrition process begins at step 118a. The abrasive attrition step 118a step may utilize a portable attrition scrubber module. Most commonly, attrition scrubbers are installed at a fixed location and are intended to be permanent or semi-permanent. Referring now to FIG. 2, the portable attrition scrubber module 200 includes a chassis 205. The chassis 205 may be any trailer designed to support the necessary equipment. The chassis has a plurality of wheels and is configured to operably connect to a truck for transport.

The various equipment required to complete the attrition process is secured atop the chassis 205. An attrition scrubber package 210 is positioned near a first end of the chassis 205. The attrition scrubber package 210 may include one or more attrition scrubber units, e.g., 212a and 212b. While two scrubber units 212a and 212b are shown in FIG. 2, it shall be understood that additional scrubber units may additionally be provided. The scrubber units 212a and 212b may be connected in series as is known in the art. The first scrubber unit 212a receives feedstock from a hopper (or feed box) 215 which is situated at the feed end 213 of the first scrubber unit 212. The hopper 215 may be configured to receive either slurry material or dry material, depending on the state of the feedstock from the first stage 101. In dry material operation, dry sand is deposited directly into the hopper 215. Spray nozzles on the hopper 215, and/or injection ports on the scrubber units 212a, 212b may allow process water to be introduced into the system at step 118b. Water may be added to the system until a solids concentration of about 60 to 80% by weight is achieved (or a moisture content of about 20-40% by weight).

Once the feedstock has moved through the scrubber units 212, it is discharged at the discharge end 214 of the scrubber package. The feedstock is received by a sump 220, which directly follows the scrubber package 210 on the chassis 205. A pump 225 is positioned near a second end of the chassis 205 and is oriented so as to receive fluid from the bottom horizonal discharge of the sump 220. The pump 225 discharges the scrubbed feedstock to the third stage 103. Electrical panels 230 disposed on the chassis 205 may provide the necessary power to the scrubber package 210, the hopper 215, the sump 220, and the pump 225.

If phase 102 is omitted, then process water 118B is introduced into the process 100 at step 112 via the water line 625.

During the third phase 103, the feedstock is classified according to the desired grade, which is selected at step 122 by adjusting process conditions. The plant may classify a single grade at a time, or multiple grades simultaneously.

To classify the wet sand, a two-stage hydraulic separation process may be used. Multiple hydraulic separators (also commonly referred to in the industry as a density separator) may be utilized during each stage, with the goal being to remove the top and bottom particle-size fractions from the product grade. During the first stage at step 124, a first hydraulic separator (or group of hydraulic separators) may remove unwanted fine material (i.e., the bottom particle-size fractions) from the wet sand, including but not limited to slimes and organic matter. In the second stage at step 126, a second hydraulic separator (or group of hydraulic separators) may remove unwanted coarse material (i.e., the top particle-size fractions). The first and second separation steps 124, 126 may occur simultaneously or in series. The tailings from the first and second separation steps 124, 126 may proceed to step 128, where a recovery process is initiated. At step 130, water recovered during step 128 is processed for reuse and/or disposal. At step 132, the tailings are disposed of. The remaining feedstock from the two-stage separation, a slurry containing the middle fraction of sand, is used as the final size-grade in the fracturing fluid. The slurry exiting from steps 124, 126 is stockpiled at step 134, and at step 136, the slurry is delivered into the fourth phase 104.

Similar to the attrition units described above, typically, hydraulic separators used in frac sand operations are installed in a fixed location at a plant and are intended to be permanent or semi-permanent. Here, the hydraulic separator(s) may be configured as mobile modules that can be transported from one site to another.

Figure 3:
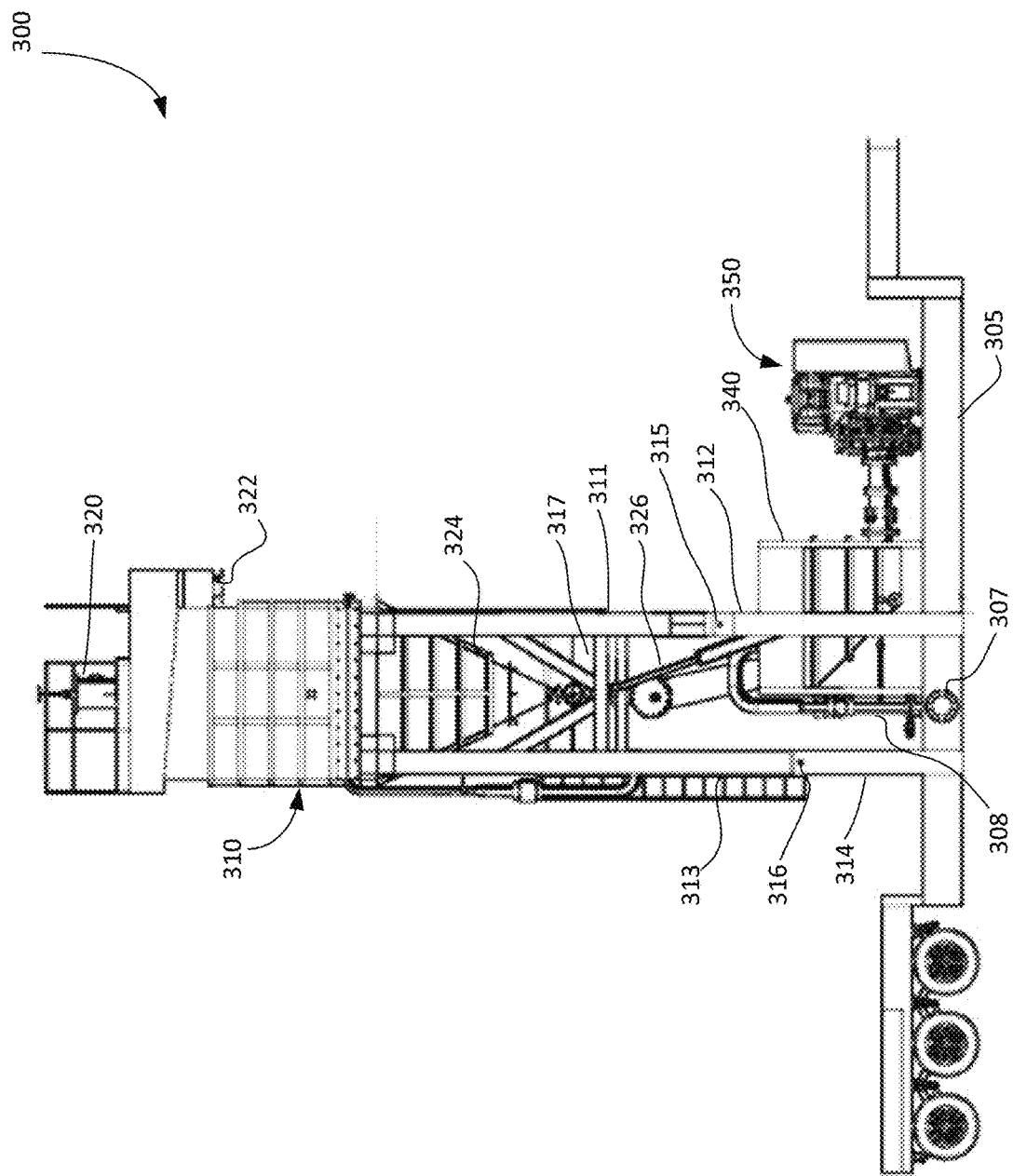
FIG. 3 illustrates a portable hydraulic separator module used in a process of producing fracturing sand in an operable orientation according to embodiments of the invention.
Figure 4:
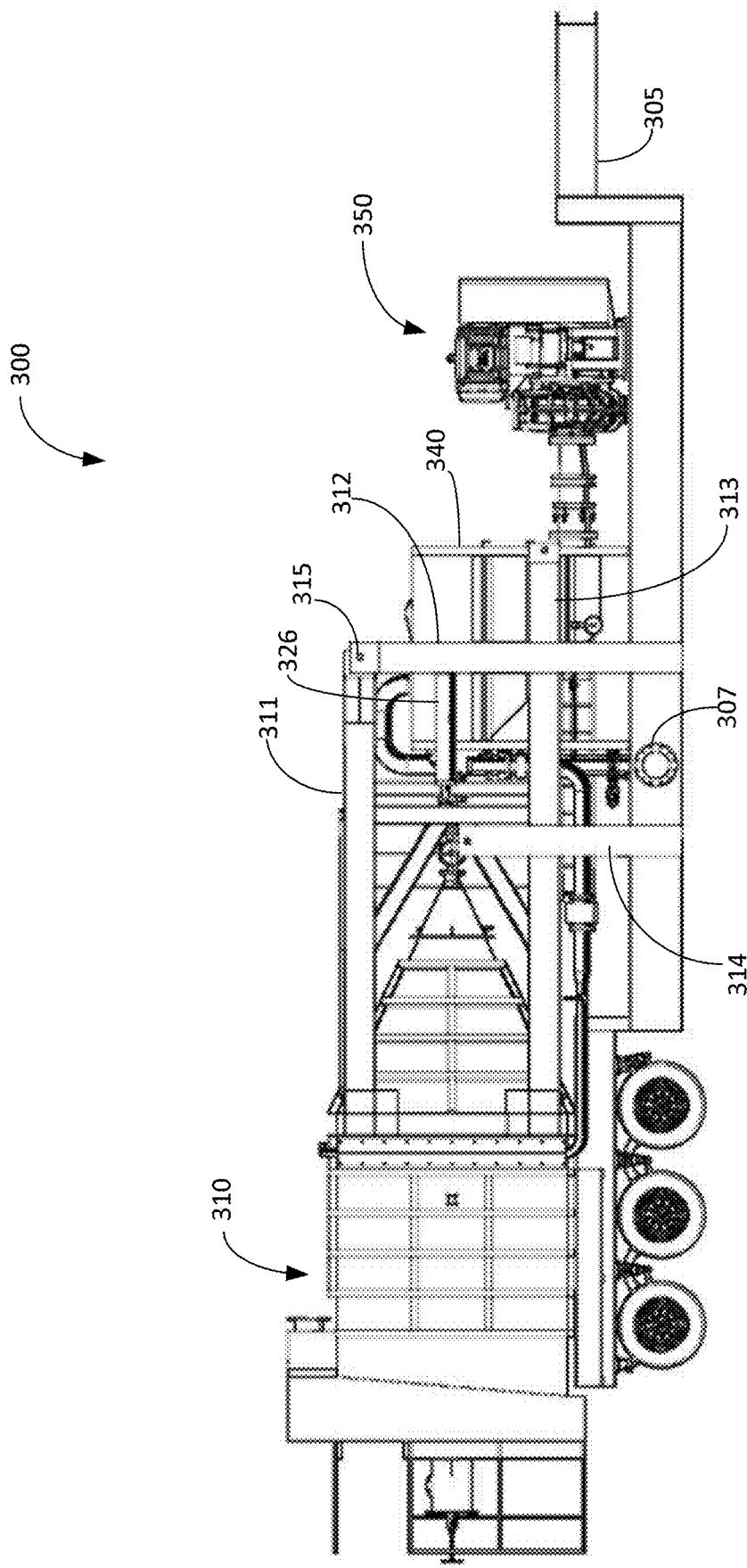
FIG. 4 illustrates the portable hydraulic separator module used in a process of producing fracturing sand in a transport orientation according to embodiments of the invention.
Figure 5:
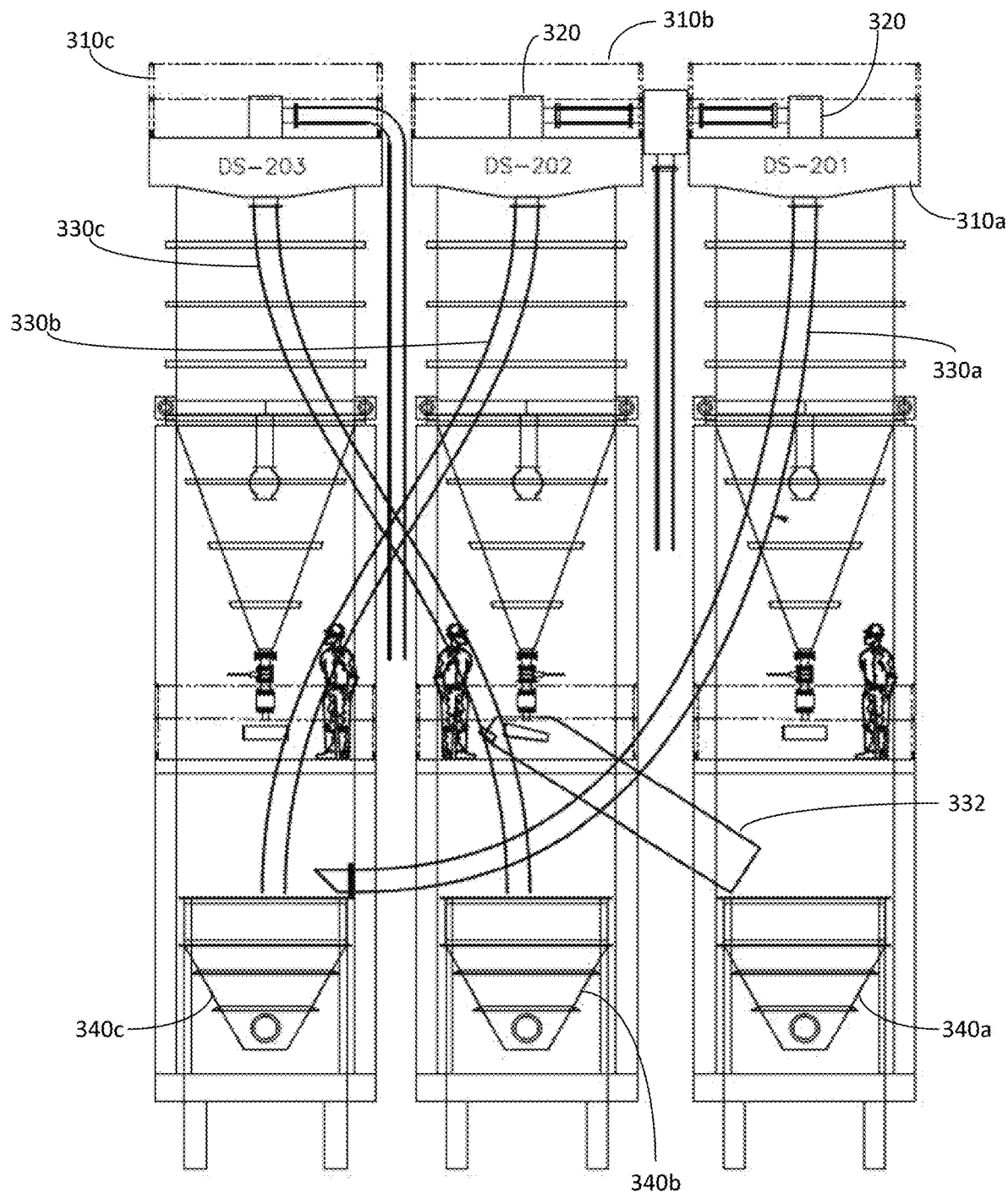
FIG. 5 illustrates a series of portable hydraulic separator modules used in a process of producing fracturing sand according to embodiments of the invention.

With reference to FIGS. 3-5, a hydraulic separator module 300 includes a chassis 305 which supports a density separator 310. The chassis 305 may have a water main 307, which may be operably coupled to a conduit for receiving water. The water may be fed, via conduit 308, into the sump 340 where it mixes with the underflow discharge from the density separator 310 as described below.

The density separator 310 is fixed to the chassis 305 via a plurality of supports 311, 312, 313, 314, and corresponding supports on the opposing side of the density separator 310 not shown. Supports 311 and 312 (and the corresponding supports on the opposite side) are fixed about a pivot point 315. Supports 313 and 314 (and the corresponding supports on the opposite side) are operably coupled via a pin 316 or other coupling mechanism when the density separator 310 is in an operational configuration, such as shown in FIG. 3. One or more actuators 326 (e.g., hydraulic actuator) may be attached between the support 312 and a brace 317 (and the corresponding components on the opposite side). The actuators 326 are operable to rotate the density separator 310 between the operational configuration and a transport configuration, shown in FIG. 4.

The density separator 310, as described above, provides the means for classifying the sand or other materials in the feedstock. As is known in the art, the density separator 310 makes a cut to separate fine material from coarse material. Each density separator 310 receives slurry (e.g., the slurry from step 136) through the feed well 320. The fine particles exit the density separator 310 through an overflow port 322, while the larger particles descend towards the collection cone 324 of the density separator 310. The slurry containing the larger particles is discharged through an opening at the bottom of the collection cone 324 into the sump 340. The sump 340 is positioned on the chassis 305 such that, when the density separator 310 is in the operational configuration, the collection cone 324 automatically discharges thereinto. A pump 350 is likewise fixed to the chassis 305, near the sump 340. The pump 350 suction receives fluid from the bottom horizontal discharge of the sump 340 for transport to another part of the process 100, or for other use.

FIG. 5 illustrates an example of a two-stage separation process using three density separators 310a, 310b, and 310c. During operation, the first density separator (or in this case, separators 310a, 310b) receives the slurry from step 136 through the feed well 320. The density separators 310a, 310b separate the fine material from the rest of the slurry (e.g., the medium-size particles and the coarse particles) as overflow. The overflow from the respective separators 310a, 310b is fed into the sump 340c via channels 330a, 330b. The underflow from separator 310b flows into the sump 340a of density separator 310a via a launder 332 where it mixes with the underflow from separator 310a. The resultant slurry in the sump 340a is pumped into the third density separator 310c, where it again makes a cut between the coarse material and the medium-size particles. The medium-size particles leave the density separator 310c as overflow, which is fed into the sump 340b via channel 330c. The remaining coarse material exits the density separator 310c as underflow and mixes with the fine material in the sump 340c. The slurry in the sump 340c provides the feedstock for the tailings recovery process of step 128. The slurry product in the sump 340b contains particles of the desired size.

With classification steps 124 and 126 complete, the slurry product from sump 340b may be pumped into one or more storage vessels at step 136. Subsequently, at step 138, the slurry product is delivered to the fourth phase of the process 100 for dewatering.

During the fourth phase 104, at step 140, the sand-containing slurry from the two-stage hydraulic separation process is dewatered. The slurry from step 138, when delivered to the fourth phase 104, has a solids concentration of less than about 40% by weight. Blenders are not typically designed to receive slurries with such a high water content. Accordingly, the sand must be dewatered to increase the solids concentration. Many methods are known for dewatering sand, including dewatering screens, dewatering bins or silos, and hydrocyclones, each of which are typically used individually. In embodiments of the invention, the middle fraction of sand from step 138 may be passed through a hydrocyclone and then transferred to a dewatering silo for storage. In other embodiments, the middle fraction of sand may be passed through a dewatering screen or a hydrocyclone in combination with a dewatering screen prior to storage in the dewatering silo. The resulting de-watered sand from the hydrocyclone (or hydrocyclone with dewatering screen) may preferably have a solids concentration of about 70 to 85% by weight. After the sand is discharged from the dewatering silo, the moisture content of the sand may be less than 30% by weight, preferably less than 20% by weight, and more preferably less than 10% by weight.

Figure 6:
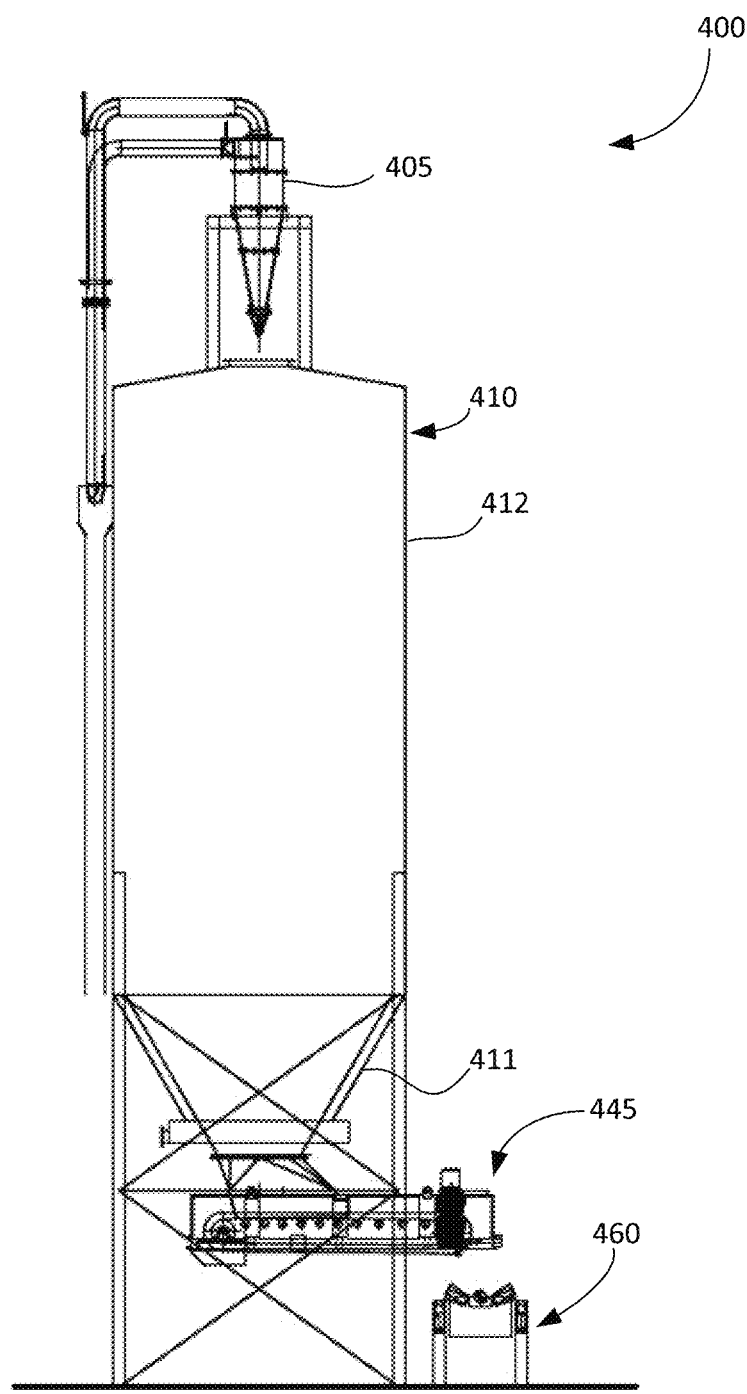
FIG. 6 illustrates a dewatering module used in a process of producing fracturing sand according to embodiments of the invention.

FIG. 6 illustrates a dewatering module 400 having a hydrocyclone 405 in combination with a dewatering silo 410. The hydrocyclone 405 may be any hydrocyclone now known or subsequently developed. The hydrocyclone 405 is positioned above the silo 410 such that the sand passes through the hydrocyclone 405 and directly into the silo 410. The feed pipe for feeding sand-containing slurry into the hydrocyclone 405, and the discharge pipe for delivering clean water away from the module 400, may be fixed along an exterior of the cylindrical section of the silo 410.

The silo 410 may be similar to a typical storage silo having a cone section 411 (typically called a dewatering cone) and a cylindrical section 412. FIGS. 9A-9D illustrate the cone section 411 in greater detail. The cone 411 has an outer shell 415 and an interior screen 420 which may include a plurality of screen sections 422A, 422B, et cetera. Each screen section 422A, 422B, et cetera may include a plurality of pinch plates coupled together. The screen 420 may be formed of a porous material, such as screens or perforated plate. The outer shell 415 and the screen 420 are angled, typically between 55 and 70 degrees relative to horizontal. Bars 425 located between the shell 415 and the screen 420 create a void space 430. The bars 425 may be, for example, bar grating. When wet sand enters the bin 410, the outer sand contacts the screen 420, and small openings in the screen allow water to pass through the screen 420 and into the void space 430. Once in the void space 430, the water falls via gravity into a discharge cavity 435 that discharges the water into a pipe 437 to transport the water away from the dewatering module 400.

Perforated pipes, which may be covered in drainage cloth, may run substantially vertically or horizontally along the cylindrical section 412 to further act as dewatering elements. The pipes may intersect the cone 411 to discharge into the void space 430.

In embodiments, the hydrocyclone 405 may be replaced by a dewatering screen. The dewatering screen may be positioned above each silo 410, and water may be pumped from the ground to the screen. Product from the dewatering screen may pass via gravity directly into the silo 410. In still further embodiments, a dewatering screen may be utilized to dewater the sand on the ground. An incline conveyor may deliver the substantially dewatered sand to the silos 410.

The dewatered sand discharged from the dewatering silo 410 may optionally be stored in a bin, tank, or on the ground prior to transportation to the blender for use at the well-site, as indicated at step 142. However, in embodiments, the silo 410 releases sand onto a belt feeder 450 which carries the sand to a belt conveyor 460 and/or delivers the sand to the ground (e.g., if the belt feeder 450 is operated in reverse). The head of the belt feeder 450 may extend outside of the radius of the silo 410 in order to offload sand from the silo 410.

The transition 440 of the silo 410 which delivers the sand to the conveyor 450 has an opening that is sufficiently large to maintain stable rathole diameter, or to ensure discharge of the wet sand without the sand bridging and plugging in the transition 440. The opening may be circular (e.g., about 24 inches in diameter), rectangular (e.g., about 24 inches wide and about 24 inches long), or any other shape with an area of at least about 450 square inches. In embodiments, the transition 440 includes a round-to-square passage, wherein the opening from the cone 411 is round, and a conversion element 442 coupled to the cone 411. The conversion element 442 includes a plurality of panels 443 secured together that attach to the circular opening in the cone 411 and extend downward to form a generally square-shaped edge 444 defining a generally square-shaped opening.

Figure 7A:
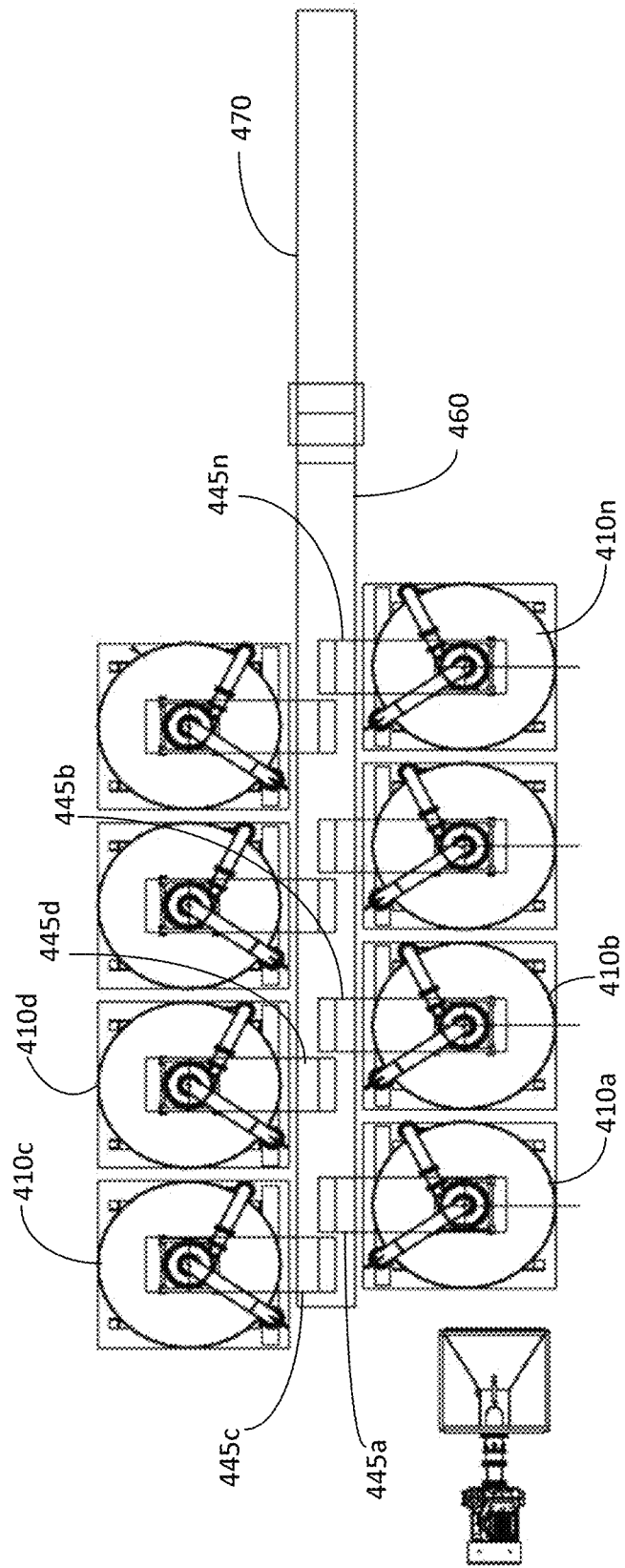
FIG. 7A illustrates a plurality of dewatering modules used in a process of producing fracturing sand according to embodiments of the invention.
Figure 7B:
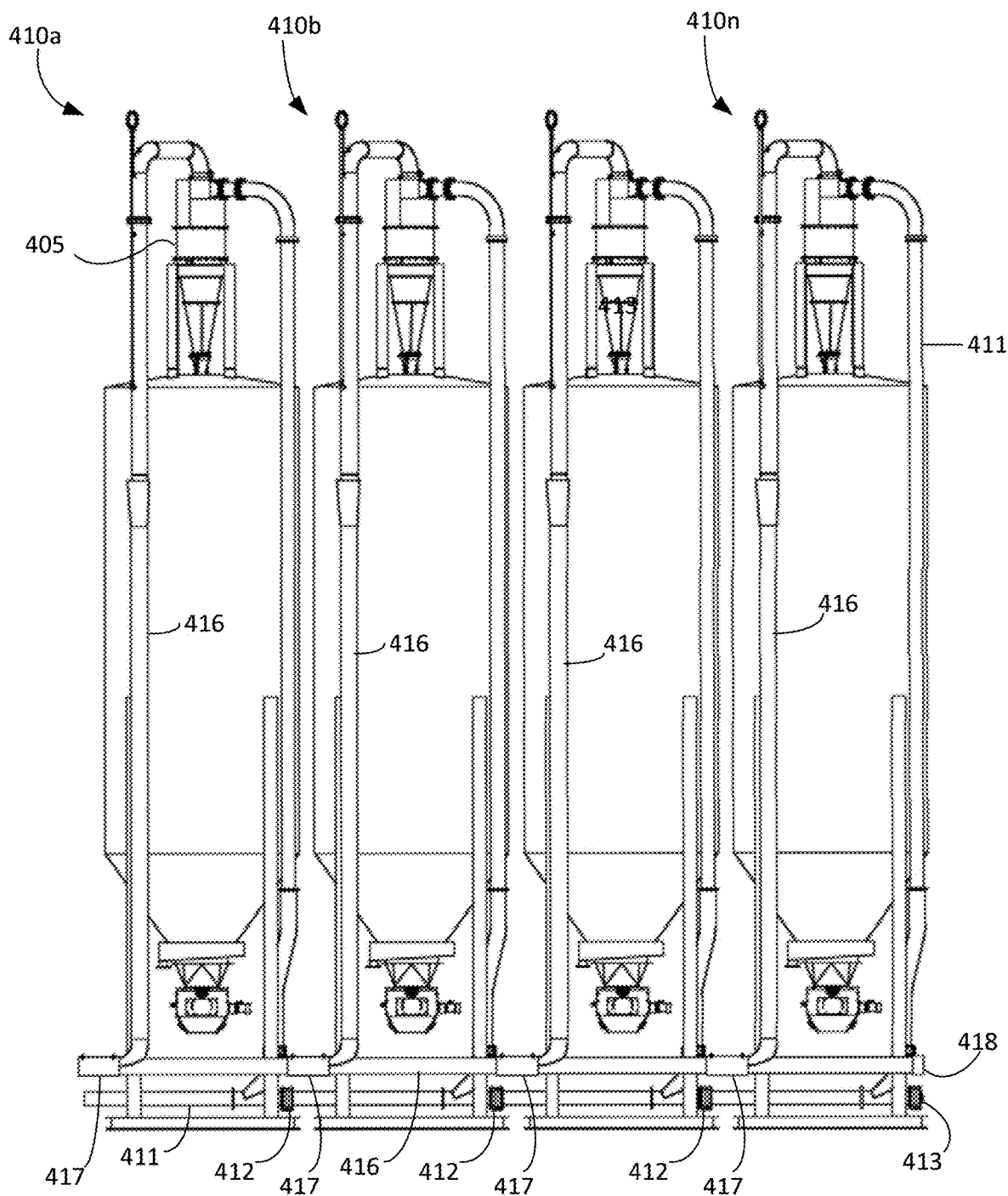
FIG. 7B is a side view of the plurality of dewatering modules of FIG. 7A.
Figure 8:
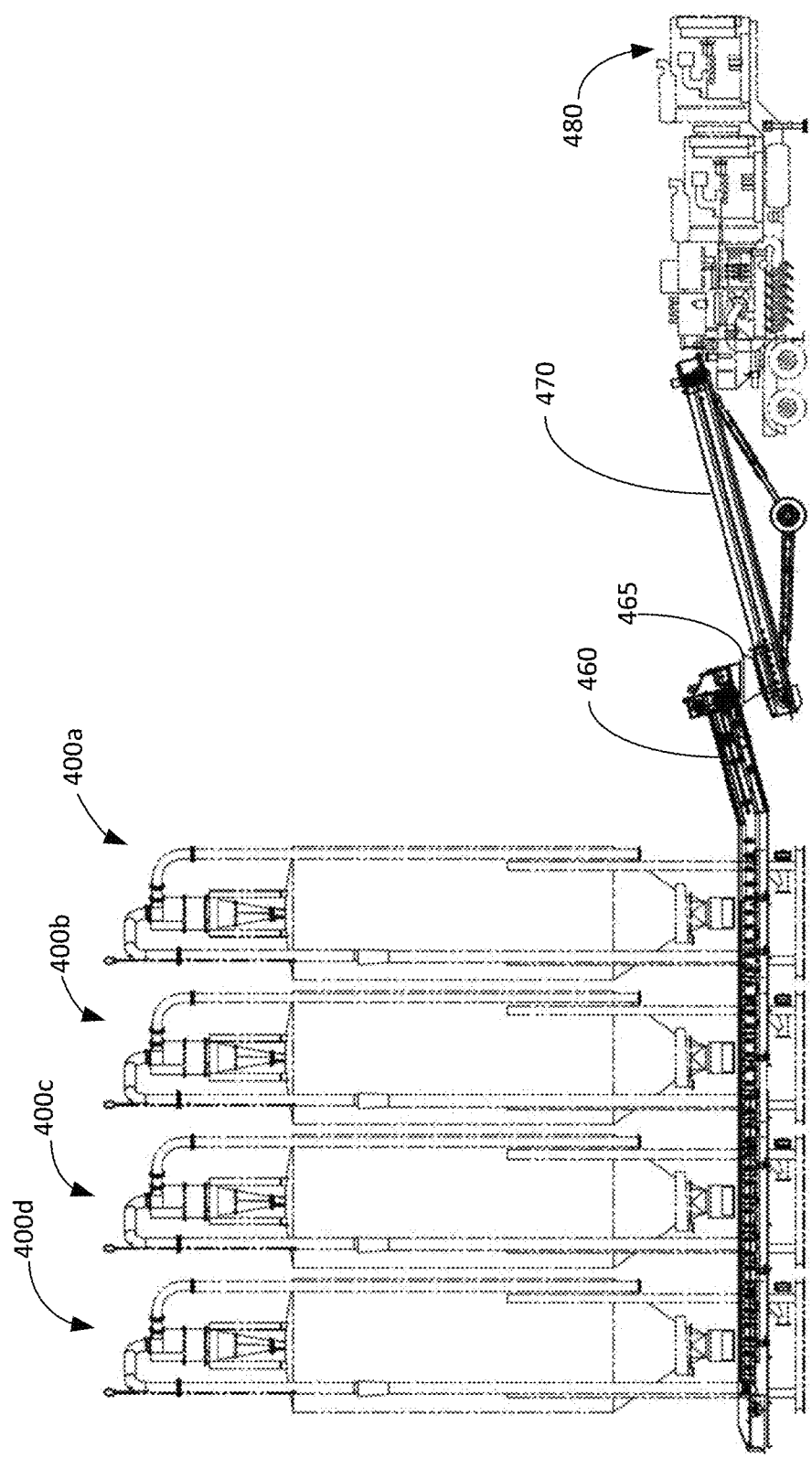
FIG. 8 illustrates a plurality of dewatering modules used, in connection with a conveying system, to provide sand to a blender for producing fracturing sand according to embodiments of the invention.
Figure 9A:
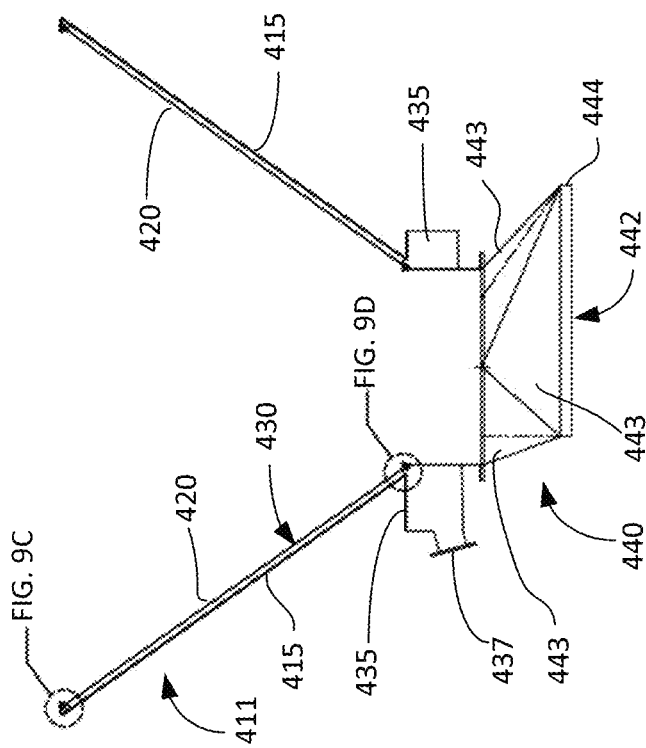
FIG. 9A is a section view of a cone section of a dewatering silo used in a process for producing fracturing sand according to embodiments of the invention.
Figure 9B:
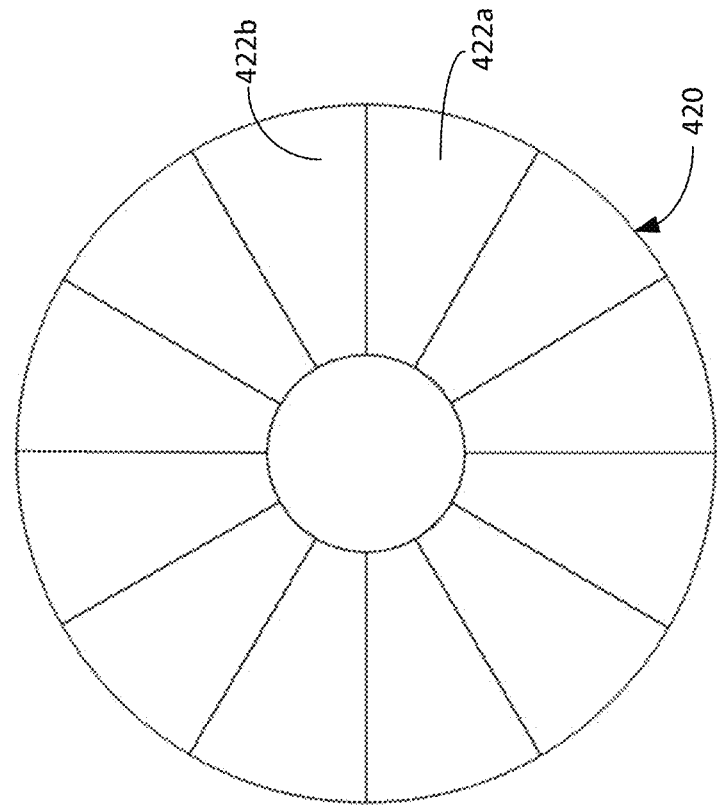
FIG. 9B is a top view of the cone section of the dewatering silo of FIG. 9A.
Figure 9C:
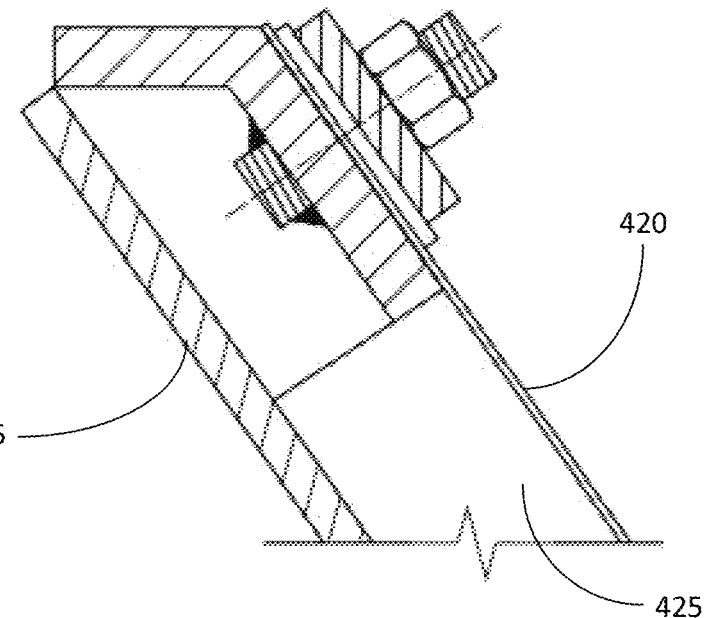
FIG. 9C is a detail view of a dewatering panel of the dewatering silo of FIG. 9A.
Figure 9D:
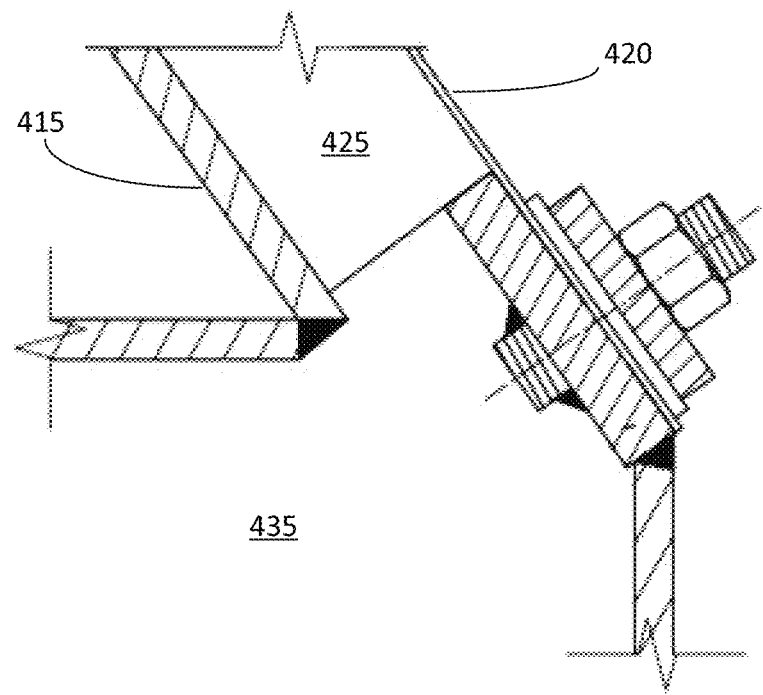
FIG. 9D is another detail view of a dewatering panel of the dewatering silo of FIG. 9A.

Because of the amount of sand that is required for fracking operations, multiple silos 410a, 410b, 410c, 410d, . . . 410n, may be required at the work site as is shown in FIGS. 7A, 7B, and 8. The slurry feed piping and the discharge piping of each of the silos 410 may be concentrically aligned such that a coupling may be used to create a single flow path for the slurry and the water. Moreover, the bins 410 may be secured together at the respective bases of each bin 410 to provide stability to the bins 410. Lines to/from the bins 410 may be daisy chained.

FIG. 7B shows a plurality of silos 410 arranged in series. A slurry supply line 411 delivers slurry to the hydrocyclones 405. Valves 412 along the supply line 411 may be individually actuated to deliver slurry to each hydrocyclone 405 separately through a single supply line. In embodiments, the valves 412 may be opened such that slurry is delivered to each hydrocyclone 405 simultaneously. An end cap 413 may be placed at the end of the supply line 411. Portions, or all, of the slurry line 411 may use flexible tubing. Water return lines 416 take reject water from the hydrocyclone for disposal or optional further processing. The water return lines 416 may be connected in series via couplings 417, and an end cap 418 may be placed at the end of the water return line 416. The reject water through the line 416 may be gravity fed.

Each silo 410 may have one or more radar continuous level transmitters. Further, limit switches may be installed for providing "hi" and "low" warnings. Cameras mounted to the tops of the bins 410 may use, for example, infrared technology to check the level of material in the bin 410. Various other equipment may be utilized with the bins 410 for safety and/or control measures, including pressure transmitters, valves, sensors (e.g., pressure sensors), gauges, et cetera.

Each silo 410n releases sand onto a belt feeder 445n, and the belt feeders 445 pass the sand to the belt conveyor 460. Accordingly, the belt conveyor 460 may be configured to receive feed from multiple dewatering modules 400. Of course, those of skill in the art shall understand that, if the sand is stored prior to transportation to the blender, the storage container may also have a belt feeder configured to deliver the sand to a belt conveyor. Or the storage container may be configured to discharge its contents directly to a belt conveyor.

The belt conveyor 460 transports the sand from the silos 410 to the blender 480. Typically, sand is fed to the blender dry. Delivering wet sand is generally considered problematic because it can plug the blender's sand screws. Additionally, it is difficult to meter damp sand without knowing the water concentration in the sand. In embodiments, a weigh feeder 470 may be situated between the belt conveyor 460 and the blender 480. The belt conveyor 460 may deliver the sand from the silos 410 to a surge hopper 465 positioned generally atop a feed end of the weigh belt feeder 470. The surge hopper 465 receives damp sand from the silos 410, which may have a moisture content of, for example, between about 3 and 15% by weight. The surge hopper 465 may have a discharge opening at stable or critical rathole diameter to prevent caking of the sand in the hopper 465. The opening may be circular, and may but need not have a diameter of, about 24 inches. In embodiments, the opening may rectangular and may be, for example, about 24 inches wide and 24 inches long. Although not necessarily required, preferably the opening has an opening with an area of at least 450 square inches.

The belt feeder 470 uses a conveyor, a load cell, and a speed sensor to measure an overall rate material weight that is being transported to the blender 480. To account for moisture in the sand, the belt feeder 470 may include a moisture probe. The moisture probe may be integrated with the weigh feeder 470 such that rates of water, dry sand, and slurry mixture delivered to the blender 480 can be determined. The belt feeder 470 meters the sand that is finally delivered to the blender 480.

In embodiments, multiple belt feeders 470 may be fed from a single surge hopper 465. To feed multiple belt feeders 470, the hopper 465 may have multiple (e.g., two) discharge cones projecting from the bottom of the hopper 465 e.g., in a "pant leg" orientation. The cones may each have sloped openings which may be inclined at least 45 degrees relative to horizontal and in embodiment, may be vertical. The belt feeders 470 may run in parallel, each feeding the blender 480. The belt feeders 470 may be substantially similar in instrumentation and methods of operation. However, the feeders 470 may be individually configured based on the needs of the system. For example, one or more belt feeders 470 in a plurality of belt feeders 470 may have a smaller width and/or may be geared in such a way to operate slower than other feeders 470 in order to meter sand to the blender 480 at lower rates. This allows more control over the system—a first feeder 470 (e.g., with a greater width and/or operating at a higher gear) provides coarse control of the feed to the blender 480, while a second feeder 470 (e.g., with a smaller width and/or operating at a lower gear) provides fine control of the feed to the blender 480.

The belt feeder 470 together with the surge hopper 465 may be mounted on a skid or may be mounted to a chassis supporting the blender 480. If skid mounted, a structure may be provided to support equipment such that the head of the belt feeder 470 extends above the blender 480 such that the sand can be delivered from the belt feeder 470 directly to the blender 480.

As is known in the art, the sand fed to the blender 480 is mixed with other fracking fluids, including water and other additives, before being pumped to the wellsite.

Figure 10:
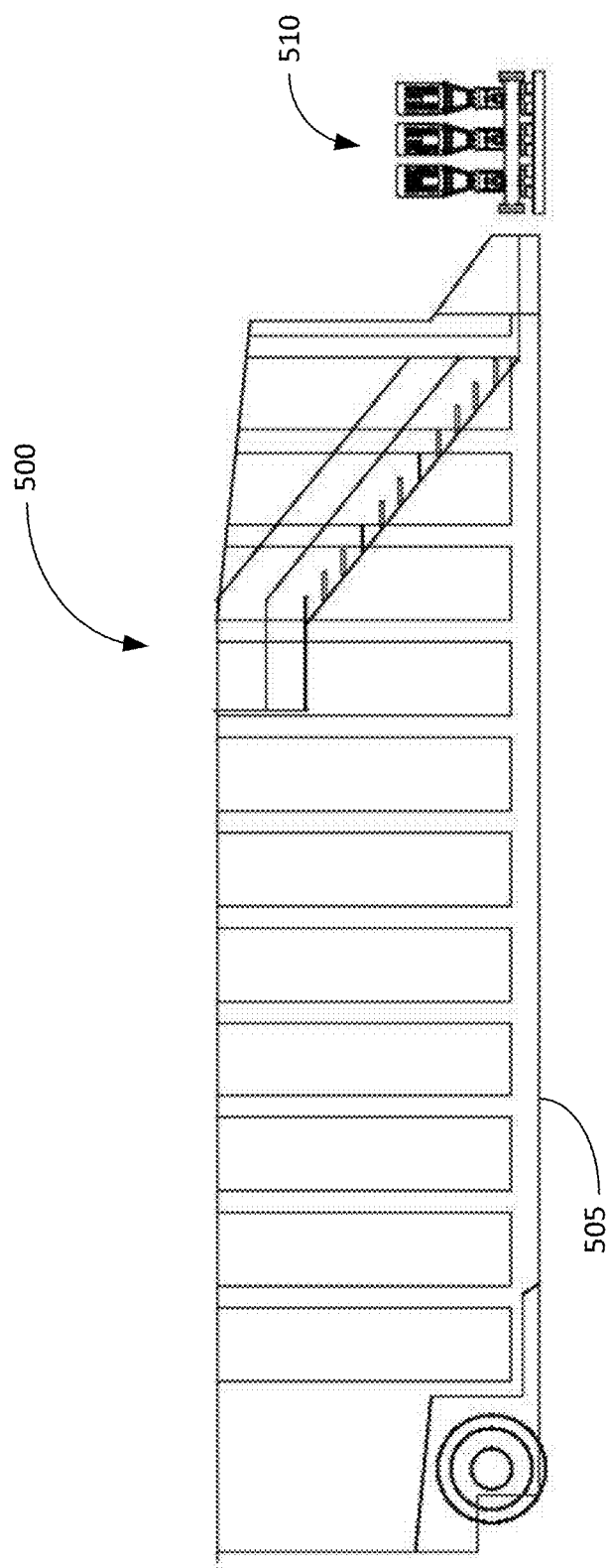
FIG. 10 illustrates a mobile tank for transporting liquids which may be used in a process for producing fracturing sand according to embodiments of the invention.

Additional components of the system may additionally be configured as mobile units. For example, FIG. 10 illustrates a mobile water tank 500 supported on a chassis 505 that may be used to transport process water to/from the work site. One or more pumps 510, which may be provided on a skid, may be operably connected to the water tank 500 for pumping water to the desired location as is known in the art.

While the various components and modules of the system (e.g., the hydraulic separator module 300, the dewatering module 400, etc.) are described as being part of a method for producing sand for hydraulic fracturing, it shall be understood that the components and modules may be operated separate from the method described herein. In other words, the hydraulic separator module may receive sand ready for hydraulic separation that has not cycled through phase 101 as described herein (e.g., the sand may have undergone a screening and/or abrasive attrition process prior to entering the process at phase 102). And the product from the hydraulic separation phrase 102 may be delivered for use other than entering phase 103. Similarly, slurry delivered for entry into phase 103 for dewatering may not have cycled through phases 101 and/or 102 as described herein.

Many different arrangements of the various components depicted, as well as components not shown, are possible without departing from the spirit and scope of the disclosure. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure. It will be understood that certain features and subcombinations are of utility and may be employed without reference to other features and subcombinations and are contemplated within the scope of the claims. Not all steps listed in the various figures need to be completed in the specific order described.

What is claimed is:

1. A mobile dewatering system for an oil and gas operation, comprising:
   a first dewatering module, comprising:
   a dewatering bin; and
   a hydrocyclone mounted atop the dewatering bin such that a particle slurry from the hydrocyclone passes directly into the dewatering bin;
   wherein the dewatering bin is pivotally coupled to a trailer chassis and is selectively operable to pivot between a transport configuration and an operation configuration.

2. The mobile dewatering system of claim 1, further comprising at least one hydraulic actuator secured between the dewatering bin and the chassis, wherein the hydraulic actuator operates to pivot the dewatering bin between the transport configuration and the operation configuration.

3. The mobile dewatering system of claim 1, wherein the dewatering bin discharges dewatered particles onto a belt feeder mounted below the dewatering bin.

4. The mobile dewatering system of claim 3, wherein the belt feeder discharges the dewatered particles onto a belt conveyor configured to deliver the dewatered particles to a blender.

5. The mobile dewatering system of claim 1, further comprising a second dewatering module comprising:
   a dewatering bin pivotally coupled to a trailer chassis and selectively operable to pivot between a transport configuration and an operation configuration; and
   a hydrocyclone mounted atop the dewatering bin such that slurry from the hydrocyclone passes directly into the dewatering bin;
   wherein each of the first and second dewatering modules is positioned substantially adjacent a belt conveyor and configured to discharge dewatered particles onto the belt conveyor.

6. The mobile dewatering system of claim 5, wherein each dewatering module comprises a belt feeder positioned beneath the dewatering bin, and wherein the dewatering bin discharges the dewatered particles onto the belt feeder, the belt feeder subsequently discharging the dewatered particles onto the belt conveyor.

7. The mobile dewatering system of claim 6, wherein:
   each dewatering module comprises piping for receiving the particle slurry and discharging water;
   the respective piping of the first and second dewatering module is aligned generally concentrically; and
   a coupling joins the respective piping of the first and second dewatering modules for receiving the particle slurry to create a single flow path of particle slurry to the dewatering modules; and
   a coupling joins the respective piping of the first and second dewatering modules for discharging water to create a single flow path of water from the dewatering modules.

8. The mobile dewatering system of claim 7, wherein at least one of the coupling of the respective piping of the first and second dewatering modules for receiving the particle slurry and the coupling of the respective pipe of the first and second dewater modules for discharging water is a flex hose.

9. The mobile dewatering system of claim 1, wherein the dewatering bin comprises a dewatering cone, the dewatering cone comprising:
   an outer wall; and
   a screen spatially adjacent the outer wall, a space being defined between the outer wall and the screen;
   wherein:
   the particle slurry introduced into the dewatering cone contacts the screen; and
   water from the slurry passes through the screen and into the space between the outer wall and the screen.

10. The mobile dewatering system of claim 9, wherein the outer wall and the screen are angled between about 55 and 70 degrees relative to horizontal.

11. The mobile dewatering system of claim 9, wherein bar grating is located within the space between the outer wall and the screen, the outer wall and the screen being substantially adjacent respective sides of the bar grating.

12. The mobile dewatering system of claim 9, wherein:
the dewatering bin further comprises a perforated pipe within a cylindrical portion of the dewatering bin; and
water from the particle slurry enters the perforated pipe and flows into the space in the dewatering cone.

13. The mobile dewatering system of claim 12, wherein the perforated pipe is covered in drainage cloth.

14. The mobile dewatering system of claim 9, wherein the space drains the water into a drainage cavity, the water being directed from the drainage cavity away from the dewatering module.

15. The mobile dewatering system of claim 9, further comprising a transition element having an opening for discharging dewatered particles, wherein a top portion of the transition element is substantially circular and couples to a discharge end of the cone and a bottom portion of the transition element is substantially square.

16. The mobile dewatering system of claim 15, wherein the opening in the transition element is sized to maintain stable rathole diameter.

17. A mobile dewatering system, comprising:
a dewatering bin pivotally coupled to a trailer chassis and selectively operable to pivot between a transport configuration and an operation configuration; and
a separation unit operably coupled to the dewatering bin such that a particle slurry from the separation unit passes to the dewatering bin.

18. The mobile dewatering system of claim 17, wherein the separation unit is at least one of a hydrocyclone and a dewatering screen.

19. The mobile dewatering system of claim 17, wherein the dewatering bin comprises a dewatering cone, the dewatering cone comprising:
an outer wall; and
a screen spatially adjacent the outer wall, a void being defined between the outer wall and the screen;
wherein:
the particle slurry introduced into the dewatering cone contacts the screen;
water from the particle slurry passes through the screen and into the void; and
dewatered particles pass from the dewatering cone through a discharge port in a bottom of the dewatering cone.

20. The mobile dewatering system of claim 19, further comprising a belt feeder positioned beneath the discharge port of the dewatering cone, wherein dewatered particles pass from the dewatering cone to the belt feeder for transport away from the mobile dewatering system.

21. A mobile dewatering system, comprising:
a dewatering bin pivotally coupled to a trailer chassis and selectively operable to pivot between a transport configuration and an operation configuration, the dewatering bin comprising:
a cylindrical section; and
a dewatering cone extending from the cylindrical section, the dewatering cone comprising:
an outer wall; and
a screen spatially adjacent the outer wall, a void being defined between the outer wall and the screen;
a plurality of perforated pipes positioned vertically around an inner circumference of the cylindrical section and intersecting the screen such that water from the a particle slurry passes into the perforated pipes and drops into the void;
wherein:
the particle slurry is introduced into the dewatering cone and contacts the screen;
water from the particle slurry passes through the screen and into the void;
water in the void is discharged away from the mobile dewatering system; and
dewatered particles pass from the dewatering cone through a discharge port in a bottom of the dewatering cone.

22. A mobile dewatering system, comprising:
a dewatering module, comprising:
a dewatering bin comprising a dewatering cone, the dewatering cone comprising:
an outer wall; and
a screen spatially adjacent the outer wall, a space being defined between the outer wall;
a hydrocyclone mounted atop the dewatering bin such that a particle slurry from the hydrocyclone passes directly into the dewatering bin;
wherein:
the particle slurry introduced into the dewatering cone contacts the screen;
water from the slurry passes through the screen and into the space between outer wall and the screen; and
the dewatering bin is pivotally coupled to a trailer chassis and is selectively operable to pivot between a transport configuration and an operation configuration.

* * * * *